United States Patent
Nakashima et al.

(10) Patent No.: US 6,511,553 B1
(45) Date of Patent: Jan. 28, 2003

(54) STEEL FOR STEEL EXCELLENT IN WORKABILITY AND METHOD OF DEOXIDIZING SAME

(75) Inventors: Junji Nakashima, Kimitsu (JP); Takashi Sawai, Himeji (JP); Mitsuo Uchimura, Kimitsu (JP); Wataru Yamada, Kimitsu (JP); Shigenori Tanaka, Kimitsu (JP); Yasuharu Sakuma, Kimitsu (JP); Akinobu Murasato, Kimitsu (JP)

(73) Assignee: Nippon Steel Corporation, Tokyo (JP)

(*) Notice: Subject to any disclaimer, the term of this patent is extended or adjusted under 35 U.S.C. 154(b) by 0 days.

(21) Appl. No.: 09/403,232
(22) PCT Filed: Feb. 17, 1999
(86) PCT No.: PCT/JP99/00693
§ 371 (c)(1),
(2), (4) Date: Oct. 15, 1999
(87) PCT Pub. No.: WO99/41421
PCT Pub. Date: Aug. 19, 1999

(30) Foreign Application Priority Data

Feb. 17, 1998 (JP) .............................. 10-034579

(51) Int. Cl.$^7$ .................... C22C 38/06; C22C 38/14
(52) U.S. Cl. .................. 148/320; 148/540; 420/84; 420/85; 420/126; 420/128
(58) Field of Search .............. 420/84, 85, 126, 420/128; 148/540, 541, 330, 320; 75/567, 543, 537

(56) References Cited

U.S. PATENT DOCUMENTS 5,879,479 A * 3/1999 Nabeshima et al. ........ 148/541
5,972,129 A * 10/1999 Beguinot et al. ........... 148/328
6,117,389 A * 9/2000 Nabeshima et al. .......... 420/83

FOREIGN PATENT DOCUMENTS

| EP | 709469 | * 5/1996 |
| EP | 785283 | * 7/1997 |
| EP | 829546 | * 3/1998 |
| JP | 58-084958 | * 5/1983 |
| JP | 05-237613 | * 9/1993 |
| JP | 5-277679 | 10/1993 |
| JP | 8-269568 | 10/1996 |
| JP | 9-192804 | 7/1997 |
| JP | 9-279302 | 10/1997 |
| JP | 10-176213 | 6/1998 |

* cited by examiner

Primary Examiner—George Wyszomierski
Assistant Examiner—Janelle Combs Morillo
(74) Attorney, Agent, or Firm—Kenyon & Kenyon (57) ABSTRACT

The present invention provides a steel for steel sheets excellent in workability and showing significantly decreased formation of surface defects, and a method of deoxidizing molten steel for the steel for steel sheets which prevents nozzle clogging during continuous-casting the molten steel. That is, the steel for steel sheets excellent in workability, comprises, based on weight, 0.0001 to 0.0030% of C, up to 0.03% of Si, 0.05 to 0.30% of Mn, up to 0.015% of P, 0.001 to 0.015% of S, up to 0.008% of Al, 0.02 to 0.08% of Ti, 0.0005 to 0.0020% of Ca, 0.0005 to 0.01% of N, optionally containing at least one of 0.001 to 0.02 wt % of Nb and 0.0001 to 0.0010 wt % of B, and the balance of Fe and unavoidable impurities. Moreover, the deoxidation method of the steel for steel sheets comprises properly adjusting addition amounts of Ca and Al as deoxidizing agents for the steel having the chemical composition mentioned above so that the chemical composition of the nonmetallic inclusions is controlled to prevent clogging of the casting nozzle.

6 Claims, 4 Drawing Sheets

STEEL FOR STEEL EXCELLENT IN WORKABILITY AND METHOD OF DEOXIDIZING SAME

TECHNICAL FIELD

The present invention relates to a steel for steel sheets excellent in workability, and a method of deoxidizing the steel. The present invention particularly relates to a steel for easily workable steel sheets which give sheet products having remarkably decreased surface defects, and a deoxidation method for preventing clogging of a casting nozzle during continuous-casting the molten steel.

BACKGROUND ART

Extra low carbon steels have been widely used in recent years for outer panels of automobiles, surface-treated steel sheets, etc. because the steels have excellent workability. The slabs for steel sheets are usually produced by decarburizing molten steel produced by a converter, etc., using a vacuum degassing procedure such as the RH process to lower the carbon concentration to an extra low carbon concentration, and continuous casting. The molten steel subsequent to decarburization must be deoxidized before continuous casting because excessive free oxygen, at a high concentration, is present therein.

In general, aluminum (Al) is used for deoxidizing the molten steel, and the conventional extra low carbon steel is an Al-killed steel. Alumina inclusions formed by deoxidizing the molten steel form clusters, which often remain in the surface layer of a continuous-cast slab to cause formation of surface defects subsequent to rolling and which remarkably lower the yield of the products. When an extra low carbon steel is to be produced, it is therefore important, from the standpoint of ensuring the surface quality, to take measures to clean the molten steel.

On the other hand, it is known that nozzle clogging taking place during continuous casting causes formation of seams such as scabs and slivers, and markedly lowers the quality of product steel sheet materials. Moreover, it is also necessary to take measures to prevent the nozzle clogging from the standpoint of ensuring high productivity which is the merit of continuous casting.

It is known that formation of nozzle clogging is caused by adhesion of alumina and alumina clusters present in the molten steel to, and the accumulation of these materials on, the inner wall surface of the immersion nozzle. Various theories about the mechanism nozzle clogging are explained in detail in "Refractories," vol. 46 (1994) pages 166–178. It is known from observation of the cross-sections of clogged nozzles that the material adhering to the inner wall surfaces of the nozzles is a mixture of alumina clusters and metal. Accordingly, in order to prevent the nozzle clogging, increasing the cleanliness of the molten steel is most important.

Measures to improve the cleanliness of the molten steel are explained in detail in "Highly Clean Steel," in the 126th and 127th Nishiyama Kinen Gijyutsu Koza (126th and 127th Nishiyama Memorial Technological Lectures) (Edited by Japan Iron and Steel Association) pages 12–14. For example, the following is described. Prevention of reoxidation of molten steel in a tundish is important, and the reoxidation can be inhibited by sealing the atmosphere within the tundish with an inert gas.

Furthermore, for the purpose of preventing nozzle clogging, a method has been proposed wherein alumina, which causes nozzle clogging, is morphologically controlled to form composite inclusions having a low melting point, and the inclusions hardly adhere to the inner wall surface of the nozzle. It is addition of Ca in molten steel that has heretofore been applied as a method of lowering the melting point of the inclusions. This effect of preventing the nozzle clogging is described in "Iron and Steel," (1986) S281. Moreover, Japanese Unexamined Patent Publication (Kokai) No. 5-237613 discloses a method of adding Ca to within a tundish in accordance with the state of nozzle clogging.

However, in order to lower the melting point of alumina clusters in the Al-killed steel, a large amount of Ca must be added, and the effect of preventing the nozzle clogging is not necessarily pronounced. As a result, there arises the problem that stabilized production of steel sheet products having no surface defects is difficult when the Al-killed steel is used.

DISCLOSURE OF INVENTION

The present inventors have previously shown (e.g., in Japanese Unexamined Patent Publication (Kokai) No. 7-111071) that a Ti-containing steel containing from 0.01 to 0.40 wt % of Ti and a decreased amount of Al has properties comparable to those of an Al-deoxidized steel, as a sheet material, and that the surface defects of a steel sheet produced from the steel can be decreased.

The reason why the Ti-containing steel containing Al in a decreased amount hardly forms surface defects is thought to be that inclusions in the molten steel are not $Al_2O_3$ inclusions which tend to coalesce to form large clusters but ones mainly containing Ti oxide.

According to the knowledge of the present inventors, however, such a Ti-containing steel is likely to clog a teeming nozzle, compared with the Al-deoxidized steel. Accordingly, in order to produce a Ti-containing extra low carbon steel sheet material having no surface defects by continuous casting, establishment of a technology for preventing clogging of a teeming nozzle is indispensable.

The present inventors have therefore proposed, as methods of preventing a Ti-containing steel containing a decreased amount of Al from clogging the nozzle, a method wherein a nozzle prepared from a specific material is used (Japanese Unexamined Patent Publication (Kokai) No. 7-111071), a method wherein the Si concentration in the molten steel is controlled (Japanese Unexamined Patent Publication (Kokai) No. 7-111073), a method wherein the oxygen concentration in the molten steel is controlled (Japanese Unexamined Patent Publication (Kokai) No. 7-111072), and the like methods.

However, the methods of controlling the concentration of Si or O cannot be applied to some steels because the methods influence the steel materials. Moreover, it has been difficult for each of the methods to completely prevent the Ti-containing steels from clogging the nozzle. It has therefore been desired to provide means which prevents the nozzle clogging more surely, and which can stably produce extra low carbon steel sheet products containing Ti without surface defects.

Accordingly, an object of the present invention is to surely prevent the above-mentioned Ti-containing steel, being likely to clog the casting nozzle, from clogging the nozzle without exerting adverse effects on the product quality and to provide a steel for Ti-containing extra low carbon steel sheets capable of significantly decreasing formation of surface defects of the products.

Inclusions tend to adhere to the inner surface of the nozzle and grow when the inclusions have a high melting point and show a significant coalescing tendency. Accordingly, another object of the present invention is to provide a deoxidation method capable of radically preventing the nozzle clogging by controlling the chemical composition of the inclusions in the molten steel so that inclusions having a low melting point and showing a decreased coalescing tendency are formed.

The present inventors have made the following discovery. Although addition of Ca in a Ti-containing steel forms inclusions having a low melting point, and decreases the surface defects of a steel sheet material, the addition amount of Ca must be adjusted so that the total Ca concentration in the molten steel falls into a predetermined range because the effect of lowering the melting point is nullified when the Ca addition amount is increased.

Furthermore, pre-deoxidation of the molten steel with a small amount of Al is desirable from the standpoint of stabilizing a high yield of Ti. However, excessive addition of Al forms inclusions similar to those in an Al-deoxidized steel, and there arises the problem that inclusions having a low melting point are not formed unless a large amount of Ca is added, as explained above. Accordingly, the present inventors have discovered that when pre-deoxidation with Al is conducted, proper control of the conditions for the pre-deoxidation with Al prior to Ti addition and adjustment of a Ca addition amount as explained above are required.

Although pre-deoxidation with Si prior to Al deoxidation is possible, Si must be used within the permissible level of a [Si] concentration (0.03%) in the molten steel because CaSi is generally used as a low cost Ca source.

Furthermore, the present inventors have made discoveries related to a proper chemical composition of the steel for Ti-containing extra low carbon steel sheets having decreased surface defects and a proper chemical composition of inclusions in the steel from the discoveries mentioned above and from the results of examining the product material.

The present invention has been achieved based on these discoveries. The steel for steel sheets according to the present invention is one for steel sheets excellent in workability, comprising, based on weight, 0.0001 to 0.0030% of C, up to 0.03% of Si, 0.05 to 0.30% of Mn, up to 0.015% of P, 0.001 to 0.015% of S, up to 0.008% of Al, 0.02 to 0.08% of Ti, 0.0005 to 0.0020% of Ca, 0.0005 to 0.01% of N and the balance of Fe and unavoidable impurities.

The steel can also comprise at least one of 0.001 to 0.02 wt % of Nb and 0.0001 to 0.0010 wt % of B.

The present invention also provides a steel for steel sheets excellent in workability and having the chemical composition of the steel mentioned above, wherein at least 70% of nonmetallic inclusions having a circle-equivalent diameter of at least 10 $\mu$m have a chemical composition with regard to the three components, $CaO$, $Al_2O_3$ and $TiO_2$, falling into the range represented by the following formulas (1a) to (1c):

$$0.03 \leq CaO/(CaO+Al_2O_3+TiO_2) \leq 0.30 \quad (1a)$$

$$0 \leq Al_2O_3/(CaO+Al_2O_3+TiO_2) \leq 0.40 \quad (1b)$$

$$0.40 \leq TiO_2/(CaO+Al_2O_3+TiO_2) \leq 0.90 \quad (1c)$$

where $CaO$, $Al_2O_3$ and $TiO_2$ represent the contents (wt %) of $CaO$, $Al_2O_3$ and $TiO_2$, respectively, in the nonmetallic inclusions.

In addition, Ti oxide in the actual cast slab sometimes has the forms of $TiO_2$ and $Ti_2O_3$, the Ti oxide is represented herein by $TiO_2$ for convenience.

The gist of a method of deoxidizing a steel for steel sheets excellent in workability according to the present invention is as described below.

(1) A method of deoxidizing a steel for steel sheets excellent in workability, wherein molten steel to be continuous-cast to give any of the steels mentioned above is deoxidized, comprising adding a predetermined amount of Ti or a Ti alloy to the non-deoxidized molten steel, and then adding Ca or a Ca alloy thereto to allow a total Ca concentration in the steel to fall into 5 to 20 ppm, whereby the nonmetallic inclusions in the molten steel are formed with Ti oxide containing CaO.

(2) A method of deoxidizing a steel for steel sheets excellent in workability, wherein molten steel to be continuous-cast to give any of the steels mentioned above is deoxidized, comprising pre-deoxidizing the molten steel with Al to allow a total Al concentration to fall into 10 to 80 ppm, adding a predetermined amount of Ti or a Ti alloy, and further adding Ca or a Ca alloy thereto to allow a total Ca concentration in the molten steel to fall into 5 to 20 ppm, whereby the nonmetallic inclusions in the molten steel are formed with Ti oxide containing CaO and $Al_2O_3$.

In addition, the total Al concentration is a weight ratio of Al in the molten steel plus Al in the inclusions to the molten steel, and the total Ca concentration is also similarly defined.

(3) The method of deoxidizing a steel for steel sheets excellent in workability described in (2) mentioned above, wherein the free oxygen concentration in the non-deoxidized molten steel is measured, and the Al addition amount in the pre-deoxidation is allowed to fall into the range represented by the formula $$W_{Al} < 162.5 + 0.375 \ C. \ (O) \quad (2)$$

wherein $W_{Al}$ is an addition amount of Al per ton of the molten steel (g/t), and C (O) is a free oxygen concentration (ppm) in the non-deoxidized molten steel.

(4) The method of deoxidizing a steel for steel sheets excellent in workability according to any of (1) to (3) described above, wherein at least 70% of the nonmetallic inclusions in the steel having a circle-equivalent diameter of at least 10 $\mu$m have a chemical composition with regard to the three components, $CaO$, $Al_2O_3$ and $TiO_2$, falling into the range represented by the formulas (1a) to (1c).

BEST MODE FOR CARRYING OUT THE INVENTION

First, the chemical composition of the steel will be explained.

In order to prevent seams caused by the formation of deoxidation products, it is important to prevent the formation of alumina clusters, and not to generate the nozzle clogging. An excessively high Al concentration increases the addition amount of a Ca alloy or Ca, which is not only uneconomical but also tends to form alumina by reoxidation when the teeming system is inadequately shielded from the air. As a result, the inclusions come to have such a chemical composition that they have a high melting point, and the teeming system refractories tend to be clogged; therefore, seams tend to be formed frequently in the products. Accordingly, the upper limit of the Al concentration is defined to be 0.008% (% designating wt % hereinafter). Moreover, since Al is used for fixing N as well as deoxidation, Al is preferably added in an amount of at least 0.001% for the purpose.

Ca is also an element important in preventing the formation of seams caused by deoxidation products. Ca reacts with alumina in the molten steel to allow the reaction products to float and lower the melting point of the inclusions. As a result, formation of coarse alumina clusters is prevented, and an increase in the adhesion of the alumina clusters to the teeming system refractories is suppressed. Furthermore, Ca reacts with alumina inclusions to which the Ca adhers, and lowers the melting point so that the nozzle clogging is prevented. Accordingly, Ca must be added in an amount of at least 0.0005% for the purpose. On the other hand, addition of Ca in an excessive amount not only results in increasing the alloy cost but also increases damage by corrosion of the teeming system refractories. Accordingly, the upper limit the Ca content is defined to be 0.0020%. However, when the life and cost of the refractories are ignored, there arises no problem even when Ca is added in an amount exceeding the upper limit, from the standpoint of lowering the melting point of the inclusions.

C is an interstitial solute element, and hardens the steel to reduce its formability when added in a large amount. In view of what is explained above and from the standpoint of improving the yield of Ti used for deoxidation and fixing C, the addition must be suppressed as much as possible; therefore, the upper limit of the C content is defined to be 0.0030%.

Si is added to deoxidize and strengthen the steel. However, because excessive addition of Si strengthens the steel overly, and reduces the formability, the Si content is defined to be up to 0.03%.

Mn is a substitution type solute element, and its addition hardens the steel and reduces the ductility. However, Mn reacts with S in the steel to form MnS, and plays a role of avoiding hot shortness caused by S. Accordingly, Mn must be added in an amount of at least 0.05% even for the well-workable steel sheets of the present invention. On the other hand, when the Mn content exceeds 0.3%, the formability is greatly reduced. The Mn content is therefore defined to be from 0.05 to 0.30%.

P is added to strengthen the steel. However, because excessive addition of P reduces the formability, the P content is defined to be up to 0.015%.

S is an unavoidable impurity element, and a smaller content of S is more desirable for the formability and prevention of hot shortness. The upper limit of the S content is therefore determined to be 0.015%. On the other hand, because seams caused by deterioration of the release properties of scales tend to be formed when the S content becomes less than 0.001%, the S content is defined to be from 0.001 to 0.015%.

Ti is used for deoxidation of the steel and fixing C and N as TiC and TiN, respectively. The Ti content must therefore be at least 0.02%. However, because the effect of adding Ti is saturated when the Ti content exceeds 0.08%, the upper limit of the Ti content is defined to be 0.08%.

Nb is an element to be added optionally. Nb improves resistance to aging of the steel by fixing C and N similarly to Ti, and at the same time improves the adhesion of plating. No addition effect is observed when the Nb content is less than 0.001%, and the effect is saturated when the Nb content exceeds 0.02%. Accordingly, the Nb content is defined to be from 0.001 to 0.02%.

B is an element to be added optionally, and is added for the purpose of improving the secondary workability. Since the highly pure extra low carbon steel of the present invention contains no dissolved C which is a grain boundary-strengthening element, the grain boundary strength is low, and longitudinal cracks can be formed when the steel is subjected to secondary working such as deep drawing plus expanding. B is effective for preventing the formation of longitudinal cracks. When the B content is less than 0.0001%, no addition effect is observed. On the other hand, the effect is saturated, and the r-value is lowered when the B content exceeds 0.0010%. Accordingly, the B content is defined to be from 0.0001 to 0.0010%.

When the steel for steel sheets of the present invention has a chemical composition as described above, formation of alumina clusters and formation of large inclusions caused by nozzle clogging can be suppressed and, as a result, surface defects can be markedly decreased. However, in order to prevent the nozzle clogging more surely during continuous casting and obtain products having no surface defects, the chemical composition of the inclusions is desirably controlled in a proper range by a deoxidation method as explained below.

That is, in addition to the steel for steel sheets of the present invention having a chemical composition as mentioned above, at least 70% of nonmetallic inclusions in the steel, which have a circle-equivalent diameter of at least 10 $\mu$m, desirably have a chemical composition with regard to the three components, $CaO$, $Al_2O_3$ and $TiO_2$, in the range represented by the formulas (1a) to (1c) mentioned above.

The inclusions having a circle-equivalent diameter of at least 10 $\mu$m are defined for reasons as explained below. That is, those inclusions which cause formation of surface defects are coarse ones having a circle-equivalent diameter of at least 100 $\mu$m. However, in order to evaluate the controlled state of the chemical composition of the inclusions in a slab stage, evaluation of inclusions having a circle-equivalent diameter of at least 10 $\mu$m must be made because the amount of the inclusions having a circle-equivalent diameter of at least 100 $\mu$m is small.

The lower limit of the proportion of CaO is defined to be 0.03 because the effect of lowering the melting point of inclusions by addition of Ca cannot be obtained when the proportion is less than 0.03. The upper limit of the proportion is defined to be 0.30 because the inclusions come to have a high melting point and tend to cause nozzle clogging when the proportion exceeds the upper limit.

Figure 3:
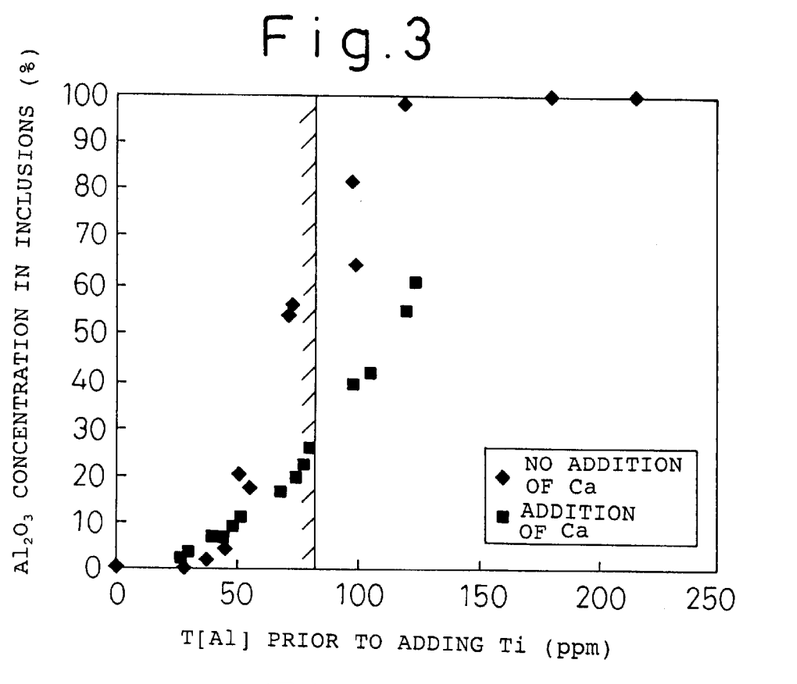
FIG. 3 is a view showing the relationship between a total Al concentration and a chemical composition of inclusions after pre-deoxidation in one example of the present invention.
Figure 4:
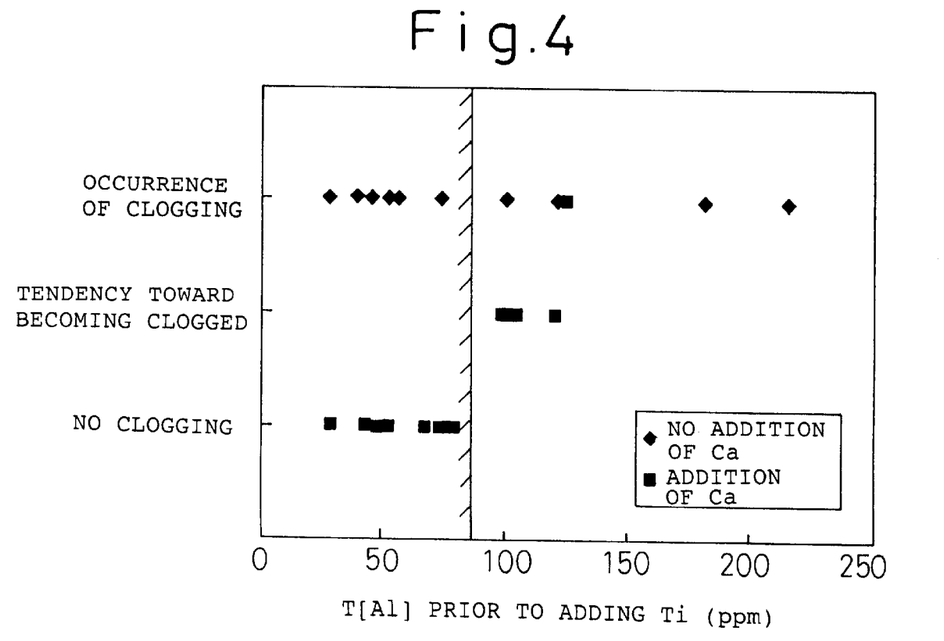
FIG. 4 is a view showing the relationship between a total Al concentration and a clogged state of an immersion nozzle after pre-deoxidation in one example of the present invention.

The reason why the upper limit of the proportion of $Al_2O_3$ is defined to be 0.40 is that the nozzle tends to be clogged even with Ca being added when the proportion exceeds the upper limit, as shown in FIGS. 3, 4.

The upper limit of the proportion of $TiO_2$ is defined to be 0.90 because the inclusions come to have a chemical composition close to $TiO_2$ itself and consequently a high melting point when the proportion exceeds 0.90. The lower limit of the proportion of $TiO_2$ is defined to be 0.40 because the concentration of CaO plus $Al_2O_3$ becomes relatively large when the proportion is less than the lower limit.

Furthermore, as will be demonstrated in examples later, it has been confirmed that no nozzle clogging takes place when at least 70% of the inclusions having a circle-equivalent diameter of at least 10 $\mu$m have a chemical composition in the range mentioned above.

Next, the deoxidation method will be explained.

An object of the deoxidation method of the steel for steel sheets excellent in workability according to the present invention is to form inclusions in the molten steel having a low melting point, thereby preventing clogging of the teeming nozzle in continuous casting, and decreasing surface defects of the products. As seen in the $CaO$—$Al_2O_3$—$TiO_2$ ternary system phase diagram shown in FIG. 6, the weight ratio of $TiO_2$:CaO in the chemical composition having the lowest melting point is approximately 2 to 4:1, and $Al_2O_3$ is in the range of 0 to 40 wt %. Moreover, because the actual inclusions contain MgO, MnO, FeO, etc. in addition to the three components mentioned above, the melting point of the actual inclusions is lower than that of the inclusions of the pure ternary system.

The melting point of the inclusions having a chemical composition in the range mentioned above is lowered to such a degree that they hardly adhere and coalesce. Accordingly, the chemical composition range is extremely effective for preventing nozzle clogging. The present invention provides means for controlling the chemical composition of inclusions in the Ti-containing steel in the range mentioned above.

First, when Al is not added, a predetermined amount of Ti or a Ti alloy is added to the non-deoxidized molten steel, and Ca or a Ca alloy is subsequently added thereto to allow a total Ca concentration (designated as T [Ca] hereinafter) in the molten steel to fall into 5 to 20 ppm, whereby the inclusions in the molten steel are formed with Ti oxide containing about 3 to 30% of CaO and having a low melting point.

According to the investigations by the present inventors, when T [Ca] is less than 5 ppm, the $CaO/TiO_2$ ratio of the inclusions becomes overly small; moreover, when T [Ca] exceeds 20 ppm, the ratio becomes excessively large. The melting point of the inclusions thus becomes high in both cases. Practically, as will be shown in FIG. 1 in an example to be explained later, it has been confirmed that the nozzle clogging can be prevented only when T [Ca] is in the range of 5 to 20 ppm.

Use of Al in combination as a deoxidizing agent is not always necessary when only lowering the melting point of the inclusions is required. However, direct addition of Ti or a Ti alloy in the non-deoxidized molten steel lowers the yield of Ti addition and the hitting rate of a Ti content in the molten steel. Pre-deoxidation with a small amount of Al is therefore preferred.

When pre-deoxidation of the molten steel with Al is carried out, the total Al concentration (hereinafter designated as T [Al]) in the molten steel subsequent to the pre-deoxidation is allowed to fall to 10 to 80 ppm. Ti or a Ti alloy is then added, and Ca or a Ca alloy is subsequently added so that T [Ca] falls into the range of 5 to 20 ppm. Consequently, inclusions in the molten steel are formed with Ti oxide containing CaO and $Al_2O_3$ and having a chemical composition in Region I surrounded by a thick line in FIG. 6. The Ti oxide surely has a still lower melting point than the Ti oxide containing CaO alone.

The upper limit of T [Al] subsequent to pre-deoxidation (prior to Ti addition) is defined to be 80 ppm because, as shown in FIGS. 3 and 4, in an example to be explained later, the inclusions have an $Al_2O_3$ concentration exceeding 40% so that the melting point becomes high, and tend to clog the nozzle when T [Al] exceeds 80 ppm.

Furthermore, the lower limit of T [Al] is defined to be 10 ppm because stabilizing a Ti yield by pre-deoxidation becomes insufficient when T [Al] is less than 10 ppm. In addition, when pre-deoxidation with Al is carried out, Ca or a Ca alloy must be added so that T [Ca] falls into the range of 5 to 20 ppm for the same reason as mentioned above.

Figure 5:
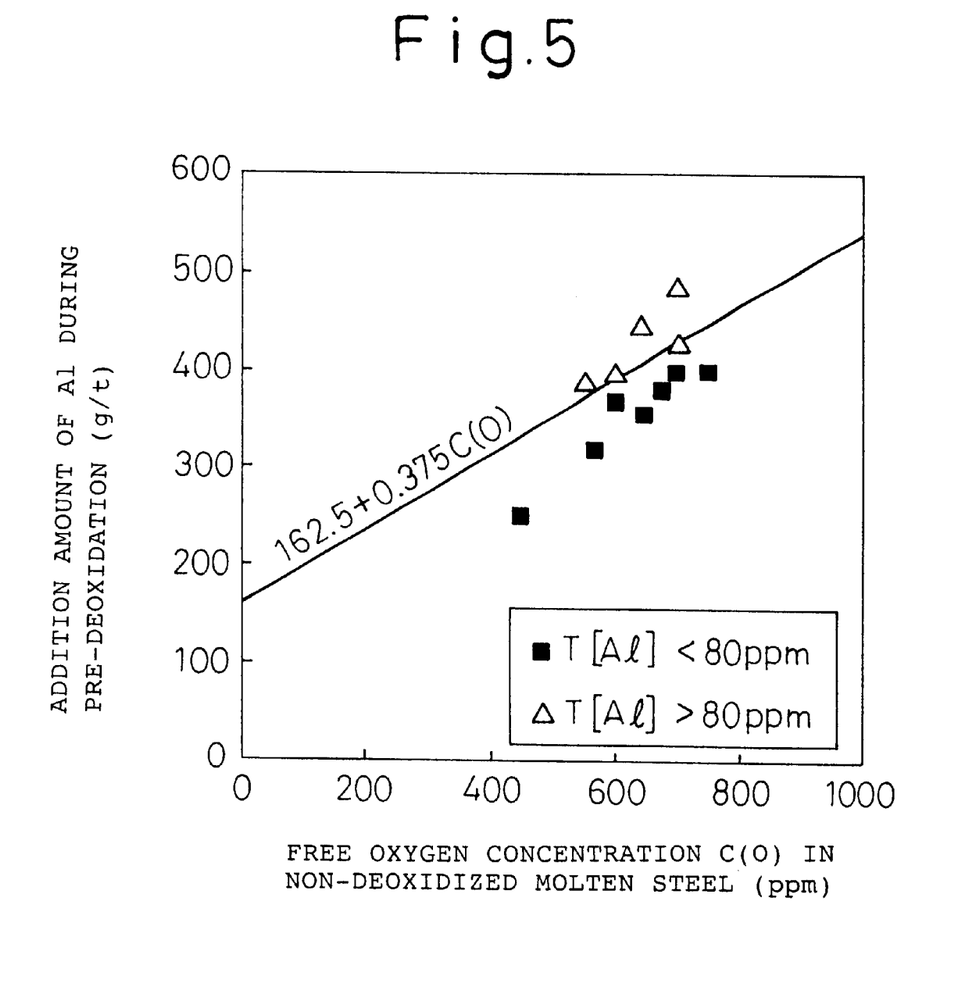
FIG. 5 is a view showing the results of investigating the relationship between a free oxygen concentration in a non-deoxidized molten steel and an Al addition amount for the purpose of allowing a total Al concentration subsequent to pre-deoxidation to fall into up to 80 ppm.

Still furthermore, for pre-deoxidation with a small amount of Al as mentioned above, the present inventors have acquired knowledge on the method of adjusting T [Al] to 80 ppm or less subsequently to pre-deoxidation. That is, the free oxygen concentration C (O) in the non-deoxidized molten steel is measured, and the addition amount of Al in the pre-deoxidation is adjusted to the range represented by the formula (2). As shown in FIG. 5 in an example to be described later, when the addition amount of Al is adjusted in accordance with the formula, T [Al] can be allowed to fall to the range of 80 ppm or less.

Addition of Ca in the Ti-containing steel of the present invention is characterized by that the addition amount is decreased and the effect of lowering the melting point of the inclusions is sure compared with addition of Ca in the conventional Al-deoxidized steel.

Figure 6:
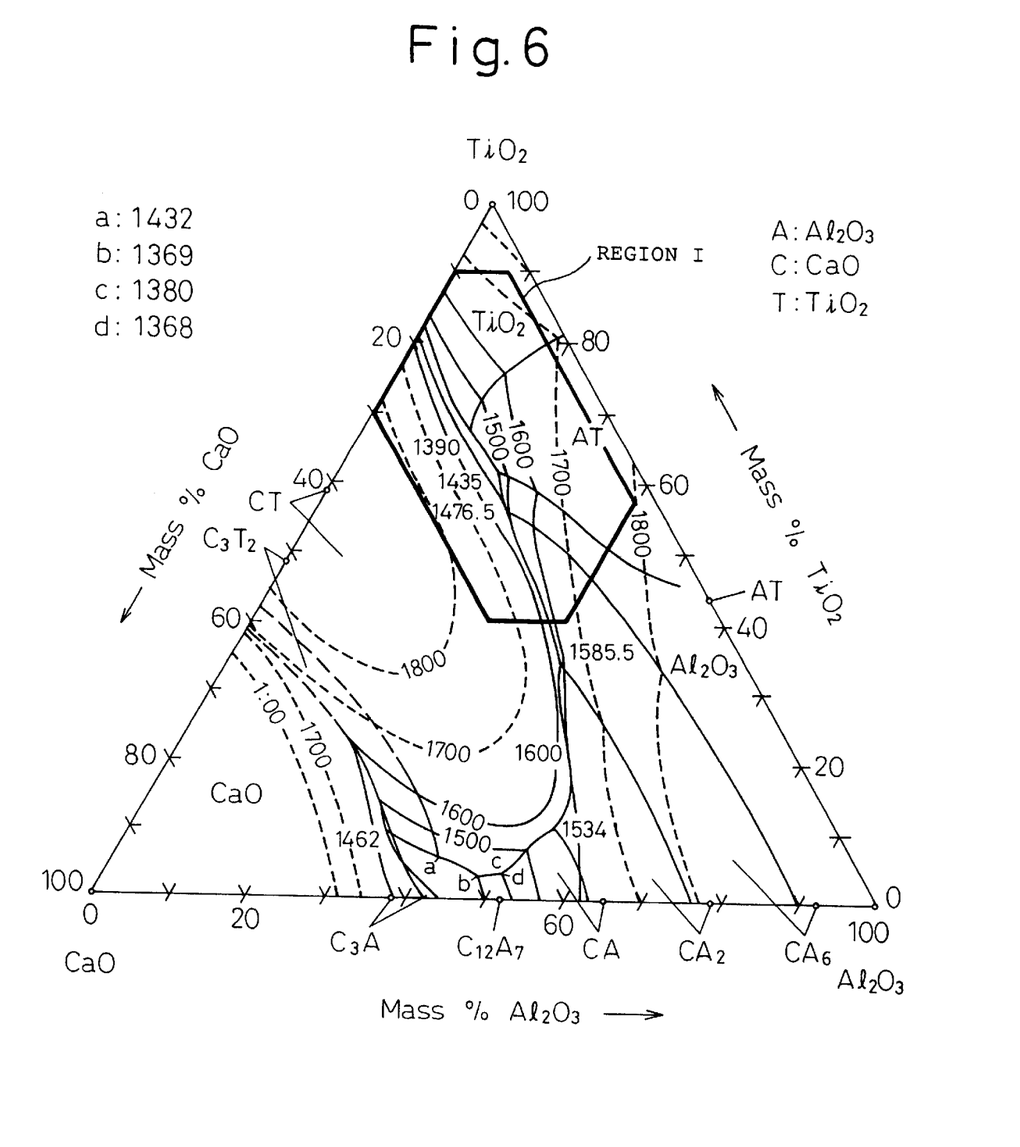
FIG. 6 is an example of a $CaO$—$Al_2O_3$—$TiO_2$ ternary system phase diagram.

That is, in order to lower the melting point of CaO—$Al_2O_3$ binary system inclusions, it is necessary to allow the CaO concentration in the inclusions to fall to the range of 40 to 60% (refer to FIG. 6). Moreover, Ca must be added in a large amount in proportion to the amount of $Al_2O_3$ inclusions. As a result, T [Ca] in the molten steel exceeds 20 ppm, and damage of the refractories caused by corrosion becomes significant. Accordingly, the CaO—$Al_2O_3$ binary system inclusions are not preferred from an operational standpoint.

The present invention will be explained in more detail by making reference to examples.

The deoxidation method of the present invention was carried out during the production of the steels for steel sheets of the present invention in the process of RH vacuum decarburization-RH deoxidation-continuous casting. The amount of molten steel was 300 ton, and the size of a mold for continuous casting was 240×1,500 mm.

EXAMPLE 1

During deoxidizing non-deoxidized molten steel within a RH vacuum bath subsequently to RH decarburization, Ti was added without adding Al, and then a Ca—Si alloy was added. The addition amount of the Ca—Si alloy was widely varied during the addition, and the relationship between an addition amount Ca and a total Ca concentration (T [Ca]) in the molten steel and the relationship between T [Ca] and a clogged state of the immersion nozzle during continuous casting were investigated. The chemical composition of the molten steel used was as follows: C: 0.0015 to 0.003%, Si: up to 0.02%, Mn: 0.08 to 0.15%, P: 0.008 to 0.012%, S: 0.002 to 0.005%, and Ti: 0.02 to 0.08%.

Figure 2:
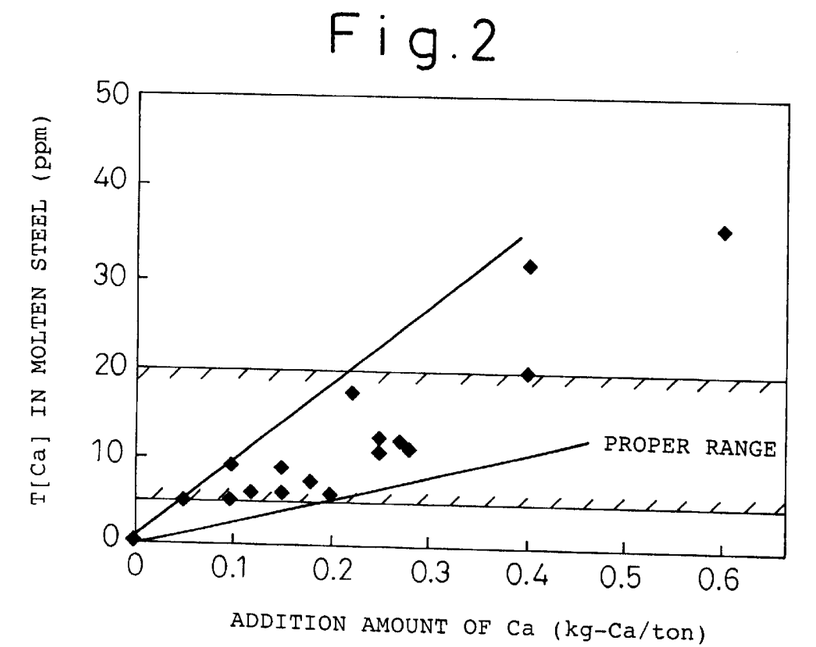
FIG. 2 is a view showing the relationship between a Ca addition amount and a total Ca concentration in one example of the present invention.

FIG. 2 shows the results of investigating the relationship between an addition amount of Ca (Ca amount in a Ca—Si alloy) and T[Ca]. T[Ca] was obtained by chemical analysis. As seen in FIG. 2, the relationship between an addition amount of Ca and T[Ca] was in an approximately definite correlation though it somewhat varied. Accordingly, it is understood that the Ca concentration in the molten steel can be approximately controlled by adjusting the addition amount of Ca.

In addition, the correlation differs depending on a free oxygen concentration in the molten steel prior to Ca addition, an iron oxide concentration in slag on the surface of the molten steel in a ladle, etc. However, T[Ca] can be adjusted in the range of 5 to 20 ppm by investigating the correlation in advance between an addition amount of Ca and T[Ca] under each production condition.

Figure 1:
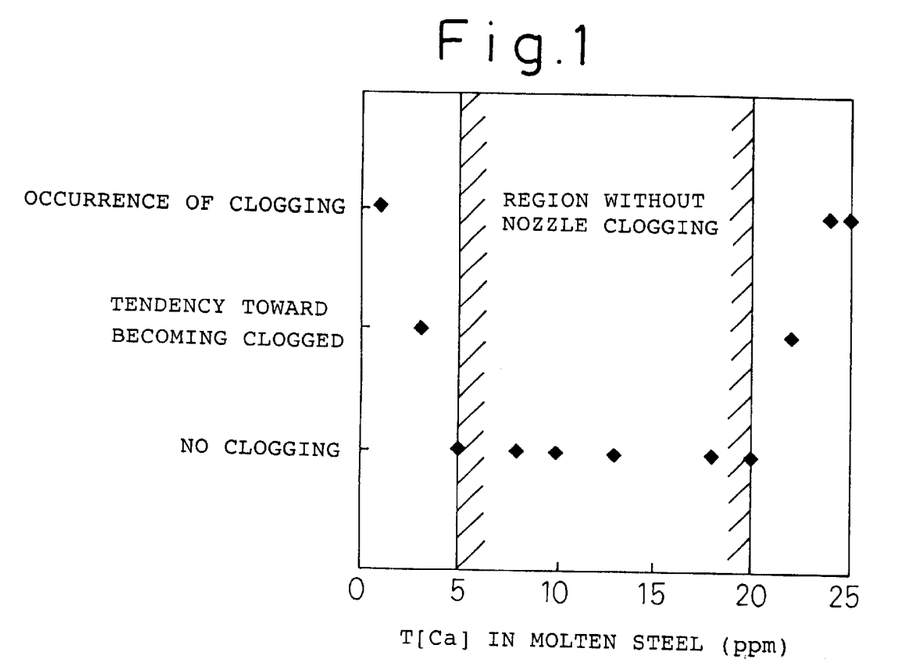
FIG. 1 is a view showing the relationship between a total Ca concentration and a clogged state of an immersion nozzle in one example of the present invention.

FIG. 1 shows the results of examining the relationship between T[Ca] and a clogged state of an immersion nozzle. The clogged state of an immersion nozzle was judged from a flowing state of molten steel after conducting continuous casting for about 6 hours.

As seen in FIG. 1, when T[Ca] was less than 5 ppm, nozzle clogging took place, or the nozzle showed a tendency toward becoming clogged. When the Ca concentration in the molten steel was in the range of 5 to 20 ppm, no nozzle clogging took place. On the other hand, it has been confirmed that nozzle clogging took place, or the nozzle showed a tendency toward becoming clogged when the Ca concentration exceeded 20 ppm.

In addition, although a Ca—Si alloy was added within a RH vacuum bath in Example 1, there is no specific limitation on the method of adding Ca.

EXAMPLE 2

When non-deoxidized molten steel subsequent to RH decarburization was to be deoxidized within a RH vacuum bath, pre-deoxidation with a small amount of Al was carried out first, and then Ti was added. A Ca—Si alloy was subsequently added so that T[Ca] fell into the range of 5 to 20 ppm. Moreover, experiments were also carried out as comparative examples, wherein Ca was not added while Al and Ti were added under the same conditions as in the above procedure.

In the examples and comparative examples mentioned above, the addition amount of Al was variously changed, and the relationship between an addition amount of Al and a total Al concentration (T[Al]) in the molten steel, and the relationship between T[Al] and a clogged state of an immersion nozzle during continuous casting were investigated. The chemical composition of the molten steel used in the experiments was approximately the same as that in Example 1 except for Al.

FIG. 3 shows the results of examining the relationship between T[Al] subsequent to pre-deoxidation and a chemical composition of inclusions. T[Al] was obtained by chemical analysis, and the chemical composition of the inclusions was obtained by quantitative analysis using EPMA.

As seen in FIG. 3, the chemical composition of inclusions which were formed when Ca was added (examples of the invention) or Ca was not added (comparative examples) greatly changed depending on T[Al] subsequent to pre-deoxidation. However, it is understood that the inclusions substantially contained no $Al_2O_3$ when T[Al] was less than 10 ppm.

On the other hand, in the present examples wherein T[Al] was allowed to fall to the range of 10 to 80 ppm, and Ca was added, the $Al_2O_3$ concentration in the inclusions fell into the range of 5 to 30%. Moreover, when T[Al] exceeded 80 ppm and Ca was added, the $Al_2O_3$ concentration in the inclusions became at least 40%; when T[Al] was exceeded 80 ppm and Ca was not added, the concentration became at least 60%.

It has been confirmed from the results of analysis of the chemical composition by EPMA that those inclusions which were formed by allowing T[Al] to fall into the range of 10 to 80 ppm, adding Ti, and then adding Ca so that T[Ca] fell into the range of 5 to 20 ppm became Ti oxide containing 5 to 30% of $Al_2O_3$ and 10 to 20% of CaO.

FIG. 4 shows the results of investigating the relationship between T[Al] subsequent to pre-deoxidation and a clogging state of an immersion nozzle. It can be understood from FIG. 4 that when T[Al] was up to 80 ppm and Ca was added, the nozzle clogging could be surely prevented. In addition, the presence or absence of the nozzle clogging was judged after continuous casting for about 6 hours, similarly to Example 1.

Furthermore, in Example 2, critical conditions for allowing T[Al] to fall to 80 ppm or less were investigated by measuring the free oxygen concentration in the non-deoxidized molten steel, and changing the addition amount of Al in pre-deoxidation. FIG. 5 shows the investigation results. It can be understood from the results that T[Al] can be allowed to fall to the range of 80 ppm or less by allowing the addition amount of Al in pre-deoxidation to fall into the range represented by the formula (2) in accordance with the free oxygen concentration in the non-deoxidized molten steel.

The molten steel in Example 2 contained less than 0.003% of C and 0.02 to 0.08% of Ti. However, for low carbon molten steel containing up to 0.1% of C and 0.01 to 0.4% of Ti, inclusions having a low melting point will be formed by the deoxidation method of the present invention, similarly to the procedure as mentioned above, and clogging of a teeming nozzle in continuous casting will be prevented.

EXAMPLE 3

Molten steel deoxidized by the method shown in Example 2 was continuous-cast into a slab. The slab was reheated at temperatures of 1,099 to 1,205° C., and hot rolled with finishing temperatures of 883 to 913° C. and coiling temperatures of 650 to 749° C. as shown in Table 1. The hot-rolled sheet was subsequently pickled, and cold rolled at a reduction of 75 to 86%. The cold rolled steel sheet was recrystallization-annealed at temperatures of 750 to 867° C. in a continuous annealing line, and temper-rolled at a reduction of 0.5 to 0.8% to give a cold-rolled steel sheet having a thickness of 0.8 to 1.0 mm.

The chemical compositions with regard to C, Si, Mn, P, S and Ti of the slabs used in examples and comparative examples in Table 1 were approximately the same as in Example 1. Moreover, slabs in examples (Nos. 1 to 8) contained 30 to 80 ppm of T[Al] and 5 to 20 ppm of T[Ca]. Slabs in comparative examples (Nos. 9 to 16) contained 100 to 250 ppm of T[Al] and 10 to 40 ppm of T[Ca].

Samples were cut out of each slab and each steel sheet (cold-rolled steel sheet), and inclusions having a circle-equivalent diameter of at least 10 μm were analyzed to give their chemical composition. The formation ratio of seams in each cold-rolled steel sheet was examined. Moreover, the presence or absence of nozzle clogging during continuous casting was judged in the same manner as in Examples 1, 2.

The chemical composition of inclusions in a slab was obtained by the following procedure: an area of at least 2 cm² in a ¼ thickness portion on the upper surface side in a ½ width portion (center in the width direction) was microscopically observed, thereby selecting inclusions each having a diameter of at least 10 μm which was obtained by converting the cross-sectional area into a circle; and 30 inclusions selected above were measured by SEM-EDX and EPMA, and the average chemical composition was obtained. The chemical composition of inclusions in a steel sheet was obtained by the following procedure: a ¼ thickness portion clogging took place, and the formation ratio of seams attributable to inclusions was zero.

On the other hand, in the comparative examples (Nos. 9 to 16) in which T [Al] and T [Ca] were outside the scope of the present invention, the proportion of the inclusions in Region I was up to 70%. The nozzle therefore tended to be clogged, and the formation ratio of seams attributable to inclusions was as high as from 1 to 5%.

TABLE 1

| No. | Reheating temperature (° C.) | Finishing temperature (° C.) | Coiling temperature (° C.) | Thickness of hot-rolled sheet (mm) | Cold rolling reduction (%) | Thickness of cold-rolled sheet (mm) | Annealing temperature (° C.) | Proportion of number of inclusions within Region I (slab, %) | Proportion of number of inclusions within Region I (sheet, %) | Nozzle clogging | Formation ratio of seams (Notes 1, 2) (proportion in length; %) | |
|---|---|---|---|---|---|---|---|---|---|---|---|---|
| 1 | 1131 | 883 | 650 | 6.0 | 86 | 0.8 | 805 | 70 | 80 | no | 0 | Invention |
| 2 | 1205 | 902 | 739 | 4.0 | 75 | 1.0 | 755 | 80 | 70 | no | 0 | |
| 3 | 1133 | 909 | 704 | 3.2 | 75 | 0.8 | 867 | 75 | 80 | no | 0 | |
| 4 | 1130 | 906 | 702 | 3.2 | 75 | 0.8 | 753 | 89 | 90 | no | 0 | |
| 5 | 1146 | 905 | 749 | 4.0 | 80 | 0.8 | 842 | 72 | 70 | no | 0 | |
| 6 | 1104 | 906 | 745 | 3.2 | 75 | 0.8 | 863 | 95 | 100 | no | 0 | |
| 7 | 1110 | 912 | 736 | 4.0 | 80 | 0.8 | 820 | 98 | 90 | no | 0 | |
| 8 | 1106 | 908 | 680 | 3.6 | 78 | 0.8 | 846 | 71 | 80 | no | 0 | |
| 9 | 1200 | 913 | 720 | 4.0 | 80 | 0.8 | 755 | 65 | 50 | tendency toward clogging | 1.4 | Comparison |
| 10 | 1125 | 901 | 725 | 4.0 | 80 | 0.8 | 885 | 50 | 40 | occurrence of clogging | 1.5 | |
| 11 | 1124 | 905 | 710 | 4.0 | 80 | 0.8 | 750 | 20 | 10 | occurrence of clogging | 2.3 | |
| 12 | 1122 | 901 | 743 | 4.0 | 80 | 0.8 | 841 | 15 | 20 | occurrence of clogging | 4.2 | |
| 13 | 1135 | 903 | 701 | 4.0 | 80 | 0.8 | 855 | 69 | 60 | tendency toward clogging | 1.1 | |
| 14 | 1099 | 902 | 699 | 3.6 | 78 | 0.8 | 846 | 32 | 40 | occurrence of clogging | 3.2 | |
| 15 | 1123 | 906 | 702 | 3.2 | 75 | 0.8 | 836 | 10 | 10 | occurrence of clogging | 5.1 | |
| 16 | 1140 | 904 | 706 | 3.6 | 78 | 0.8 | 871 | 63 | 60 | tendency toward clogging | 1.3 | |

Note 1: Formation ratio of seams attributable to inclusions is determined as follows: one seam is counted as 1m, and the proportion of the seam length to the entire coil length is calculated.
Note 2: The seams mentioned here are restricted to those judged, from their appearance, to be attributable to inclusions.

on the upper surface side in a ½ width portion (center in the width direction) was microscopically observed, thereby selecting 10 inclusions each having a circle-equivalent diameter of at least 10 μm; and the inclusions selected above were measured by SEM-EDX and EPMA, and the average chemical composition was obtained. In order to remove the influence of a matrix in both cases, the measured values were obtained by removing an Fe component, and expressing in terms of 100%. Moreover, the inclusions were confirmed to be oxide by EPMA. Measurements of inclusions in a slab were made on a slab basis, and measurements of inclusions in a steel sheet were made on a coil basis.

Furthermore, for seams, those attributable to inclusions were visually judged and evaluated in a product inspection line. Table 1 shows the production conditions of each cold-rolled steel sheet and the results of investigation mentioned above.

Of the inclusions which had a circle-equivalent diameter of at least 10 μm in any of Nos. 1 to 8 having a chemical composition in the scope of the present invention, more than 70% of them each had a chemical composition in which the three components, CaO, $Al_2O_3$ and $TiO_2$, were in the range represented by the formulas (1a) to (1c) (within Region I surrounded by a thick line in FIG. 6). Accordingly, no nozzle Industrial Applicability As explained above, the present invention can provide easily workable steel sheets excellent in formability and showing a markedly decreased formation of surface defects on the products. The steel of the present invention can naturally be used as cold-rolled steel sheets, and it can also be used for electrogalvanized steel sheets and alloyed galvanized steel sheets after annealing because the chemical composition of the steel sheets does not particularly reduce the plating ability. Moreover, the steel of the invention can also be used as substrates for steel sheets having an organic coating. Furthermore, the steel of the invention can also be used as steel sheets to be continuously annealed and hot dip galvanized, and steel sheets to be subjected to alloyed hot dip galvanizing, so long as the continuous annealing conditions are satisfied. Accordingly, the steel of the invention can be widely used for household appliances, automobiles, and the like, and the steel produces extremely valuable effects on industries.

Furthermore, according to the deoxidation method of the present invention, inclusions in Ti-containing molten steel are formed with Ti oxide containing CaO and having a low melting point, or Ti oxide containing CaO and $Al_2O_3$ and having a low melting point so that clogging of a teeming nozzle in continuous casting is prevented. Consequently, the surface defects of the steel sheets can be significantly decreased. The method of the present invention can lower the melting point of the inclusions with a smaller addition amount of Ca than that in the conventional method in which Ca is added to an Al-killed steel, and prevent clogging of a teeming nozzle more surely because the inclusions thus formed have a low melting point.

What is claimed is:

1. A steel for steel sheets excellent in workability, comprising, based on weight, 0.0001 to 0.0030% of C, up to 0.03% of Si, 0.05 to 0.30% of Mn, up to 0.015% of P, 0.001 to 0.015% of S, up to 0.008% of Al, 0.02 to 0.08% of Ti, 0.0005 to 0.0020% of Ca, 0.0005 to 0.01 of N and the balance of Fe and unavoidable impurities;

wherein at least 70% of nonmetallic inclusions having a circle-equivalent diameter of at least 10 μm have a chemical composition with regard to the three components, CaO, $Al_2O_3$ and $TiO_2$, falling into the range represented by the following formulas:

$$0.03 \leq CaO/(CaO+Al_2O_3+TiO_2) \leq 0.30$$

$$0 \leq Al_2O_3/(CaO+Al_2O_3+TiO_2) \leq 0.40$$

$$0.40 \leq TiO_2/(CaO+Al_2O_3+TiO_2) \leq 0.90$$

where CaO, $Al_2O_3$ and $TiO_2$ represent the contents (wt %) of CaO, $Al_2O_3$ and $TiO_2$, respectively, in the nonmetallic inclusions.

2. A steel for steel sheets excellent in workability according to claim 1, further comprising at least one of 0.001 to 0.02 wt % of Nb and 0.0001 to 0.0010 wt % of B.

3. A method of deoxidizing a non-deoxidized molten steel for use in continuous casting of a steel sheet, said steel sheet having a composition, based on weight, of 0.0001 to 0.0030% of C, up to 0.03% of Si, 0.05 to 0.30% of Mn, up to 0.015% of P, 0.001–0.015% of S, up to 0.008% of Al, 0.02 to 0.08% of Ti, 0.0005 to 0.0020% of Ca, 0.0005 to 0.01% of N and the balance of Fe and unavoidable impurities, said method comprising:

pre-deoxidizing the non-deoxidized molten steel by adding Al to said non-deoxidized molten steel in an amount to result in a total Al concentration in the molten steel in a range of 10 to 80 ppm;

deoxidizing by adding Ti or Ti alloy to said pre-deoxidizing molten steel in an amount sufficient to provide said 0.02 to 0.08% Ti in said steel sheet;

further adding Ca or Ca alloy to said molten steel in an amount to result in a total Ca concentration in the molten steel in a range of 5 to 20 ppm;

thereby forming nonmetallic inclusions of $TiO_2$, CaO and $Al_2O_3$ in the molten steel.

4. A method of deoxidizing a non-deoxidized molten steel for use in continuous casting of a steel sheet, said steel sheet having a composition, based on weight, of 0.0001 to 0.0030% of C, up to 0.03% of Si, 0.05 to 0.30% of Mn, up to 0.015% of P, 0.001–0.015% of S, up to 0.008% of Al, 0.02 to 0.08% of Ti, 0.0005 to 0.0020% of Ca, 0.0005 to 0.01% of N, at least one of 0.001 to 0.02% of Nb and 0.0001 to 0.0010% of B, and the balance of Fe and unavoidable impurities, said method comprising:

pre-deoxidizing the non-deoxidized molten steel by adding Al to said non-deoxidized molten steel in an amount to result in a total Al concentration in the molten steel in a range of 10 to 80 ppm;

deoxidizing by adding Ti or Ti alloy to said pre-deoxidizing molten steel in an amount sufficient to provide said 0.02 to 0.08% Ti in said steel sheet;

further adding Ca or Ca alloy to said molten steel in an amount to result in a total Ca concentration in the molten steel in a range of 5 to 20 ppm;

thereby forming nonmetallic inclusions of $TiO_2$, CaO and $Al_2O_3$ in the molten steel.

5. The method of deoxidizing a steel for steel sheets excellent in workability according to claim 3 or 4, wherein the free oxygen concentration in the non-deoxidized molten steel is measured, and the Al addition amount in the pre-deoxidation is allowed to fall into the range represented by the formula $$W_{Al} < 162.5 + 0.375 \ C \ (O)$$

wherein $W_{Al}$ is an addition amount of Al per ton of the molten steel (g/t), and C (O) is a free oxygen concentration (ppm) in the non-deoxidized molten steel.

6. The method of deoxidizing a non-deoxidized molten steel according to claim 3 or 4, wherein at least 70% of the nonmetallic inclusions in the steel having a circle-equivalent diameter of at least 10 μm have a chemical composition with regard to the components $TiO_2$, CaO and $Al_2O_3$ falling into a range represented by the following formulas:

$$0.03 \leq CaO/(CaO+Al_2O_3+TiO_2) \leq 0.30$$

$$0 \leq Al_2O_3/(CaO+Al_2O_3+TiO_2) \leq 0.40$$

$$0.40 \leq TiO_2/(CaO+Al_2O_3+TiO_2) \leq 0.90$$

where CaO, $Al_2O_3$ and $TiO_2$ represent the contents (wt %) of CaO, $Al_2O_3$ and $TiO_2$, respectively, in the nonmetallic inclusions.

* * * * *

UNITED STATES PATENT AND TRADEMARK OFFICE
CERTIFICATE OF CORRECTION

PATENT NO. : 6,511,553 B1
DATED : January 28, 2003
INVENTOR(S) : Junji Nakashima et al.

It is certified that error appears in the above-identified patent and that said Letters Patent is hereby corrected as shown below:

<u>Title page,</u>
Item [54], Title, change "...STEEL FOR STEEL EXCELLENT IN WORKABILITY AND METHOD OF DEOXIDIZING SAME..." to
-- ...STEEL FOR STEEL SHEETS EXCELLENT IN WORKABILITY AND METHOD OF DEOXIDIZING SAME... --

Signed and Sealed this

Third Day of August, 2004

JON W. DUDAS
*Acting Director of the United States Patent and Trademark Office*